(12) United States Patent
Enge et al.

(10) Patent No.: US 8,509,488 B1
(45) Date of Patent: Aug. 13, 2013

(54) IMAGE-AIDED POSITIONING AND NAVIGATION SYSTEM

(75) Inventors: Per K. Enge, Mountain View, CA (US); Yi-Hsiu Wang, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 12/711,913

(22) Filed: Feb. 24, 2010

(51) Int. Cl.
*G06K 9/00* (2006.01)
*G06K 9/20* (2006.01)

(52) U.S. Cl.
USPC ........... 382/106; 382/113; 382/154; 382/181; 382/285; 701/448; 701/223

(58) Field of Classification Search
USPC ......... 382/106, 113, 154, 181, 285; 701/448, 701/223
See application file for complete search history.

(56) References Cited

U.S. PATENT DOCUMENTS

| | | | |
|---|---|---|---|
| 6,522,889 B1* | 2/2003 | Aarnio | 455/456.5 |
| 6,879,284 B2* | 4/2005 | Dufek | 342/357.34 |
| 7,272,467 B2* | 9/2007 | Goncalves et al. | 700/245 |
| 8,144,920 B2* | 3/2012 | Kansal et al. | 382/100 |
| 2002/0191862 A1* | 12/2002 | Neumann et al. | 382/284 |
| 2005/0162523 A1* | 7/2005 | Darrell et al. | 348/211.2 |
| 2005/0190972 A1* | 9/2005 | Thomas et al. | 382/218 |
| 2006/0244830 A1* | 11/2006 | Davenport et al. | 348/148 |
| 2007/0088497 A1* | 4/2007 | Jung | 701/207 |
| 2008/0079631 A1 | 4/2008 | Lo et al. | |
| 2010/0191459 A1* | 7/2010 | Carter et al. | 701/208 |
| 2010/0295971 A1* | 11/2010 | Zhu | 348/240.99 |

FOREIGN PATENT DOCUMENTS

WO    WO 9941920 A1 *  8/1999

OTHER PUBLICATIONS

Hile, et al. Positioning and Orientation in Indoor Environments Using Camera Phones. Article. University of Washington, 2007. Print.*

* cited by examiner

*Primary Examiner* — Michael A Newman
(74) *Attorney, Agent, or Firm* — DeLizio Gilliam, PLLC

(57) ABSTRACT

Satellite-based navigation techniques can help determine a user's position on a map and can also determine directions to a destination. Functionality can be implemented to determine the user's orientation and direction of motion based on a captured image taken in the direction of motion. The captured image may be preprocessed to compensate for a camera angle and to vary image properties before being transmitted to a server. The user's orientation may be determined based, at least in part, on knowledge of a user's position on a map and comparing the captured image to a set of other images. Walking directions can accordingly be tailored based on the user's orientation.

28 Claims, 7 Drawing Sheets

IMAGE-AIDED POSITIONING AND NAVIGATION SYSTEM

BACKGROUND

Embodiments of the inventive subject matter generally relate to the field of wireless communications, and more particularly, to image-aided positioning and navigation techniques.

Devices with satellite navigation capabilities typically receive signals from a set of navigation satellites and determine a user's position. The devices may present interactive maps, points of interest around the user's position, routing directions to a destination, etc. These devices can include cell phones that include two-way communications, satellite navigation, cameras, and inertial sensors.

SUMMARY

Various embodiments for image-aided positioning and navigation are disclosed. In one embodiment, a first image captured by a mobile device is received at a server. The first image is indicative of an orientation of the mobile device. Position information of the mobile device is received at the server. The position information is indicative of the current location of the mobile device. It is determined whether one or more of a plurality of reference images, associated with the server, are associated with the position information of the mobile device. The first image is compared to the one or more of the plurality of reference images, if the one or more of the plurality of reference images are associated with the position information of the mobile device. An orientation of the mobile device is determined based, at least in part, on results of said comparing the first image to the one or more of the plurality of reference images associated with the position information of the mobile device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
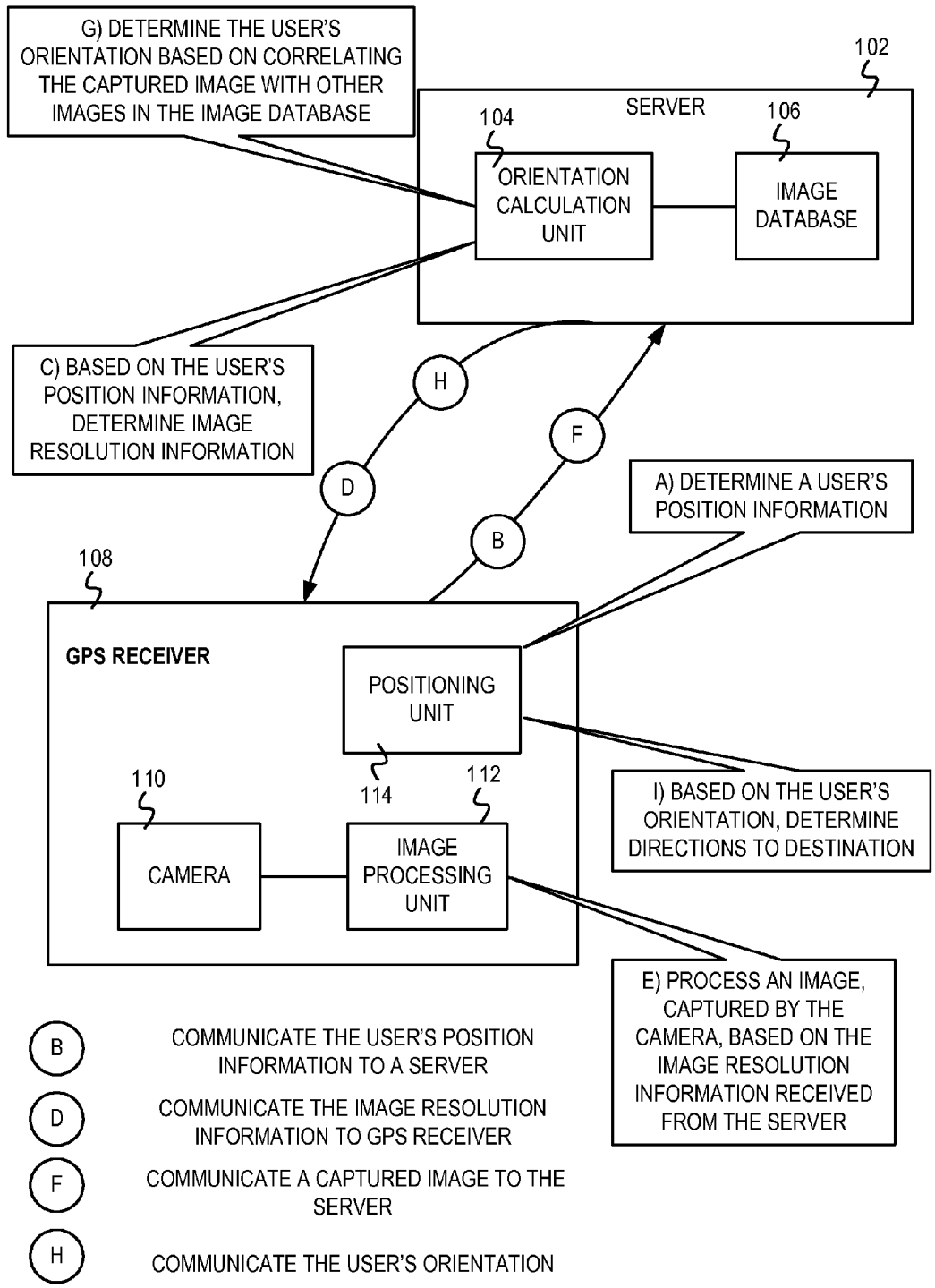
FIG. 1 is a conceptual diagram illustrating example operations for image-aided satellite-based navigation.

The description that follows includes exemplary systems, methods, techniques, instruction sequences, and computer program products that embody techniques of the present inventive subject matter. However, it is understood that the described embodiments may be practiced without these specific details. For instance, although examples refer to image-aided satellite-based navigation in a Global Positioning System (GPS), in other implementations, techniques for image-aided satellite-based navigation may be implemented in other satellite navigation systems (e.g., GLONASS) or combinations of satellite navigation systems (e.g., a combination of GPS and GLONASS). Moreover, although examples refer to determining a user's position information based on a plurality of satellites, in other implementations, Wi-Fi based position estimation techniques or cellular position estimation techniques may be used to estimate the user's position information. In other instances, well-known instruction instances, protocols, structures, and techniques have not been shown in detail in order not to obfuscate the description.

In a satellite-based navigation device ("navigation device"), determining routing information and a user's relative direction of motion is typically easy in a fast moving environment. This is because the position of the user in the fast moving environment changes rapidly with time. On the contrary, determining and providing routing information to pedestrians is typically challenging because the user walks at a much slower speed. Although the navigation device can determine the user's position on a map (e.g., the user's GPS coordinates), the navigation device may not be able to detect the user's direction of motion or may take a long time to determine the user's orientation and direction of motion. For example, the user may have to walk a substantial distance before the navigation device can determine a change in position and accordingly the user's direction of motion. When presented with walking directions to a destination, the user may have to expend a considerable amount of effort to determine a direction in which the user should walk. Absence of orientation information may also result in the user walking in an opposite direction for a considerable amount of time before the navigation device can detect and inform the user of a change in directions. A stationary user can employ a magnetic compass to sense orientation by sensing the Earth's magnetic field. However, the magnetic compass and other such sensors are subject to large errors especially when ferrous objects are nearby. In addition, the magnetic compass may only serve a single purpose of estimating direction and may be more expensive as compared to sensors and systems that serve multiple purposes.

Functionality can be implemented to determine the user's orientation and direction of motion based on an image captured from the user's current location ("captured image"), taken in the user's direction of motion. The navigation device can implement functionality to capture an image from the user's current location with a camera built into the navigation device, and transmit the image to a server. The navigation device may also implement functionality to process the image to reduce dependence on image angle and distance and reduce bandwidth requirements (e.g., compensate for camera tilt, correlate multiple images, vary the image resolution and size, etc.) before transmitting the image to the server. The server, in turn, can implement functionality to compare the captured image to a host of other images. The efficiency of the server can be improved by transmitting the user's position on the map to the server. The server can correlate the captured image to other images of locations around the user's position and accordingly determine the user's orientation. This can help ensure that navigation information provided to the pedestrian user is tailored based on the user's orientation, thus enabling accurate and efficient pedestrian navigation.

FIG. 1 is a conceptual diagram illustrating example operations for image-aided satellite-based navigation. FIG. 1 depicts a server 102 and a Global Positioning System (GPS) receiver 108. The GPS receiver 108 and the server 102 are communicatively coupled to each other. The server 104 comprises an orientation calculation unit 104 coupled to an image database 106. The GPS receiver 108 comprises a positioning unit 114, a camera 110, and an image-processing unit 112. The image-processing unit 112 receives an image captured by the camera 110 and processes the image. It should be noted that in some implementations, the camera 110 might not be implemented on the GPS receiver 108. The GPS receiver 108 may be implemented on a mobile phone or other suitable electronic device with built-in image capturing and processing capabilities. The server 102 receives an image from the GPS receiver 108 and determines a user's orientation, as will be described below.

In some implementations, at stage A, the positioning unit 114 of the GPS receiver 108 determines information about a user's current position ("user's position information"). The user's position information may be determined in terms of GPS coordinates, latitudes and longitudes, geospatial coordinates, etc. The positioning unit 114 may receive signals from a combination of GPS satellites, identify the satellites in line of sight of the GPS receiver 108, and determine the user's position information.

At stage B, the positioning unit 114 communicates the user's position information to the server 102. The positioning unit 114 may encapsulate the user's position information in a packet along with a time stamp indicating a time at which the user's position information was determined, modulate the packet onto an RF signal, and transmit the RF signal to the server 102. In some implementations, the positioning unit 114 may communicate the user's position information to the server 102 in response to detecting the user initiating a navigation feature and the camera 110 capturing an image from the user's current location in the user's direction of motion ("captured image").

At stage C, the orientation calculation unit 104 in the server 102 determines image resolution information based on the user's position information. The orientation calculation unit 104 may access the image database 106 and determine a number of images associated with the user's position information. For example, the orientation calculation unit 104 may correlate the user's position information with the position information of the other images in the image database 106, and identify images with the same position information as the user's position information or images with position information within a suitable distance from the user's position information (e.g., within a 100 meter radius). The orientation calculation unit 104 may determine the image resolution information based on a number of available images associated with the user's position information in the image database 106. In some implementations, if the orientation calculation unit 104 determines that the image database 106 comprises a large number (e.g., greater than a pre-determined threshold) of images associated with the user's position information, the orientation calculation unit 104 may indicate that a low-resolution captured image should be transmitted. Alternately, if the orientation calculation unit 104 determines that the image database 106 comprises a small number (e.g., less than the pre-determined threshold) of images associated with the user's position information, the orientation calculation unit 104 may indicate that a high-resolution captured image should be transmitted. In some implementations, in addition to the number of images, associated with the user's position information, available in the image database 106, the orientation calculation unit 104 can also determine other information associated with the images in the database 106 to determine the image resolution information. For example, the orientation calculation unit 104 can determine a quality (e.g., resolution, size, etc.) of the images in the image database 106, and an approximate time when the images were taken (e.g., based on a time stamp).

At stage D, the orientation calculation unit 104 communicates the image resolution information to the GPS receiver 108. The orientation calculation unit 104 may indicate a resolution of the image (e.g., 2 megapixels), a maximum file transfer size, and/or other suitable image parameters as part of the image resolution information.

At stage E, the image processing unit 112 processes the image captured by the camera 110 based on the image resolution information received from the server 102. The camera 110 may capture the image in response to detecting a trigger from the user, e.g., the user pressing a button to capture the image. The image processing unit 112 may apply various data compression algorithms and image processing algorithms to reduce the resolution of the image from a current resolution setting if a captured image of a lower resolution should be transmitted to the server. However, the image processing unit 112 may not modify the captured image if the resolution of the captured image is already at the desired resolution. In other implementations, the image resolution information can be used in other ways to process the resolution of the image, the size of the image, etc., as will be further described below with reference to FIGS. 4-6. For example, in one implementation, the image resolution information may be used to preset the image resolution settings of the camera 110 to capture an image of a specified resolution.

At stage F, the GPS receiver 108 communicates the captured image to the server 102. As mentioned earlier, the GPS receiver 108 may or may not transmit a processed image depending on the image resolution information received from the orientation calculation unit 104. Also, in some examples, if the image resolution information is not received or is not available from the server, the GPS receiver 108 can transmit the image based on the current or default resolution settings.

At stage G, the orientation calculation unit 104 determines the user's orientation by correlating the captured image with other images in the image database 106. In some implementation, the orientation calculation unit 104 may first identify images in the image database 106 associated with the user's position information. Then, the orientation calculation unit 104 can compare the captured image with the related images from the image database 106. The orientation calculation unit 104 may compare the captured image with the related images from the image database 106 to determine a direction in which the user is facing, e.g., north, south, etc. For example, the orientation calculation unit 104 may receive an image of the Golden Gate bridge, compare the captured image to other images of the Golden Gate bridge in the image database 106, and determine that the user who captured the image is facing north. In some implementations, the orientation calculation unit 104 may also use feature extraction techniques to identify objects (e.g., buildings, structures, street signs, etc.) in the captured image, compare the features in the captured image to features in the other images associated with the current's position information, and accordingly determine the user's orientation.

At stage H, the orientation calculation unit 104 of the server 102 communicates the user's orientation to the positioning unit 114 of the GPS receiver 108. The orientation calculation unit 104 may indicate the user's orientation with reference to the captured image. For example, the orientation calculation unit 104 may indicate that the user is facing North, assuming that the user is facing in the direction of the captured image received from the GPS receiver 108.

At stage I, the positioning unit 114 determines directions to a destination based on the user's orientation. The positioning unit 114 may determine walking directions to a destination (e.g., specified by the user) based on knowledge of the direction in which the user is facing. For example, the positioning unit 114 may provide instructions such as "Based on current orientation, turn around, walk straight for 100 ft, and then make a right turn". The positioning unit 114 may also determine points of interest (e.g., restaurants, tourist attractions, shopping areas, etc.) based on the user's position information and the user's orientation. In other implementations, however, a navigation unit on the server 102 may determine directions to the destination based on the user's orientation and communicate the directions to the destination to the GPS receiver 108.

However, it should be noted that in some implementations, the server 102 may determine that there do not exist images in the image database 106 to which the captured image can be correlated. For example, the server 102 may determine that there are no images in the image database 106 associated with the user's position information. The server 102 may request the positioning unit 112 to determine and communicate the user's orientation. For example, the positioning unit 112 may use an on-board compass to determine the user's orientation. As another example, the positioning unit 112 may prompt the user to move, determine a set of position estimates, and determine the user's direction of motion and orientation. The positioning unit 112 may communicate the user's orientation to the server 102. The server 102 may associate the user's orientation with the captured image to aid subsequent users estimate their orientation. In another example, if the on-board compass or other such sensors are not available and if the server 102 cannot identify images that match the captured image, the user may be prompted to move and/or to change orientation and capture a new image (e.g., an image of a different scenery, building, etc.). The server may compare the new captured image against the images in the image database 106 and determine whether there exist images in the image database 106 to which the new captured image can be correlated.

It should also be noted that although FIG. 1 describes operations for image-aided positioning and navigation in a dedicated satellite-based navigation device (e.g., the GPS receiver 108), embodiments are not so limited. In some implementations, the operations for image-aided positioning and navigation may be implemented on a mobile device (e.g., a mobile phone, a laptop, a netbook, a personal digital assistant, etc.) with or without navigation capabilities. It is further noted that although FIG. 1 describes the user's position information (determined at stage A) being determined from satellites that constitute the satellite based navigation system embodiments are not so limited. In some implementations, the user's position information may be determined using Wi-Fi based techniques (e.g., by determining a closest access point, by triangulation, by RF fingerprinting, etc.), using cellular-based techniques (e.g., cellular triangulation, etc.) It is further noted that in some implementations, a combination of one or more techniques can be used to determine the user's orientation and directions to the destination. For example, Wi-Fi based position estimation may be used to determine the user's position information while satellite-based navigation techniques may be used to determine the directions to the destination. The operations for image-aided positioning may also be used in navigation techniques that are based on cellular technologies (e.g., using cell phone transmitters), Wi-Fi technologies (e.g., using Wi-Fi access points), etc.

It should also be noted that in addition to varying the image resolution and image size of the captured image, in some implementations, the GPS receiver 108 might implement other image processing functionality. For example, the GPS receiver 108 may implement functionality for determining and communicating a distance between the user's current position and an object in the image. The server 102 may use this distance to determine whether the user's position information is accurate, as will be described below with reference to FIG. 4. As another example, the GPS receiver 108 may comprise an inclinometer that determines an inclination angle (e.g., tilt) of the camera 110 with respect to a reference. Based on the inclination angle of the camera 110, the image-processing unit 112 may rotate the image to compensate for the inclination angle. Operations for correcting the inclination angle will further be described below with reference to FIG. 5. As another example, the GPS receiver 108 may implement functionality for correlating and providing multiple images of the user's current location to the server 102 for enhanced image-aided navigation. The multiple images may be captured using multiple cameras or by capturing multiple images with a single camera 110, as will be described below with reference to FIG. 6.

Figure 2:
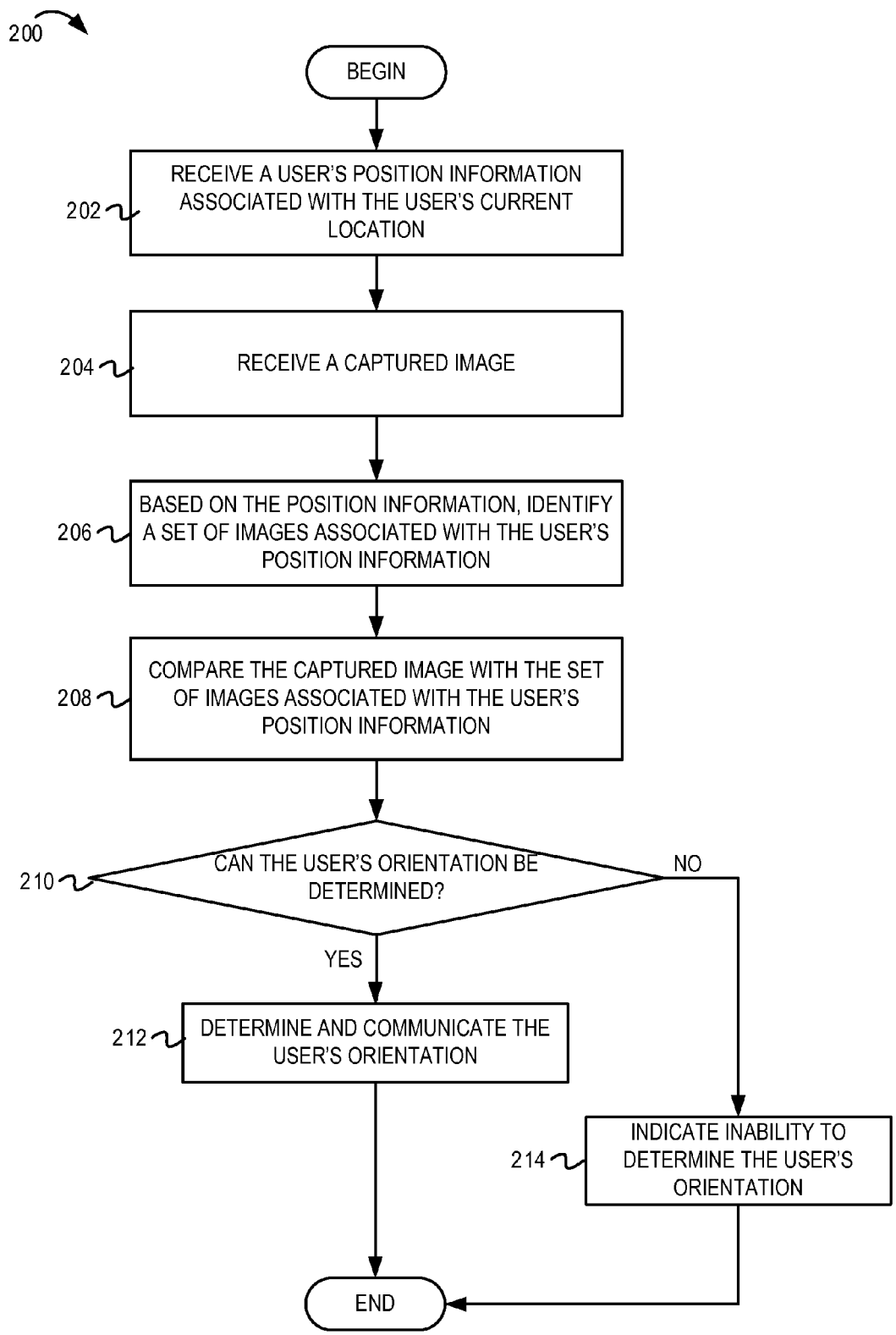
FIG. 2 is a flow diagram illustrating example operations for image-aided satellite-based orientation identification.

FIG. 2 is a flow diagram illustrating example operations for image-aided, satellite-based orientation identification. Flow 200 begins at block 202.

At block 202, a user's position information associated with the user's current location is received. For example, the orientation calculation unit 104 of the server 102 (shown in FIG. 1) may receive the user's position information from the GPS receiver 108. The positioning unit 114 of the GPS receiver 108 may determine the user's position information by processing signals received from multiple GPS satellites.

In some implementations, after the orientation calculation unit 104 receives the user's position information, the orientation calculation unit 104 may access an image database 106 to determine a resolution of the image of the current location that should be transmitted by the GPS receiver 108. For example, the orientation calculation unit 104 may identify images, in the image database 106, associated with the user's position information. If the number of images, in the image database 106, associated with the user's position information exceeds a threshold, the orientation calculation unit 104 may direct the GPS receiver 108 to remove extraneous features from a captured image, reduce the resolution and bandwidth, and transmit a low-resolution captured image. Alternately, if the number of images, in the image database 106, associated with the user's position information is less than the threshold, the orientation calculation unit 104 may direct the GPS receiver 108 to not process but to transmit a high-resolution captured image.

Also, in some implementations, the orientation calculation unit 104 may determine the image resolution information based on other factors, such as a quality (e.g., resolution, size, etc.) of images in the image database 106, an approximate time when the images were taken, etc. It is noted, however, that in other implementations the orientation calculation unit 104 may not determine and transmit image resolution information to the GPS receiver 108. The flow continues at block 204.

At block 204, the captured image is received. For example, the orientation calculation unit 104 may receive the captured image from the GPS receiver 108. The flow continues at block 206.

At block 206, a set of images associated with the user's position information are identified. For example, the orientation calculation unit 104 may access the image database 106 and identify the set of images with the same position information as the user's position information, or within a specified distance (e.g., 100 meter radius) from the user's position information. In one implementation, the orientation calculation unit 104 can identify images, associated with user's position information, that are stored within the image database 106. In another implementation, the set of images associated with the user's position information may be downloaded to the image database 106 from one or more external databases (e.g., a Google® database, e.g., a "street view" database). In some implementations, the orientation calculation unit 104 may download a requisite set of images each time the orientation calculation unit 104 receives the captured image requesting image-aided navigation. In other implementations, the orientation calculation unit 104 may cache the set of images associated with frequently received position information and may access the set of images associated with the user's position information from the cache (if available). The flow continues at block 208.

At block 208, the captured image is compared with the set of images associated with the user's position information received from the GPS receiver 102. For example, the orientation calculation unit 104 may compare the captured image to the set of images, in the image database 106, associated with the user's position information. The orientation calculation unit 104 may identify objects in the captured image (e.g., buildings, street signs, other structures, etc.) and determine whether any images of the set of images associated with the user's position information comprise the same objects. The flow continues at block 210.

At block 210, it is determined whether the user's orientation can be determined. For example, the orientation calculation unit 104 may determine whether the user's orientation can be determined. The orientation calculation unit 104 may determine that the user's orientation can be determined in response to identifying at least one image from the set of images associated with the user's position information that matches the captured image. The orientation calculation unit 104 can use pattern-matching techniques (e.g., correlation algorithms) to identify images that best match the captured image. In other words, the orientation calculation unit 104 may correlate the captured image with the set of images associated with the user's position information and identify images that are highly correlated with the captured image. For example, if the captured image comprises a tall building, the orientation calculation unit 104 may try to identify other images with the same tall building. In some implementations, the orientation calculation unit 104 may identify other objects in the captured image (e.g., street signs, bus stops, names of shops, etc.) to increase the possibility of finding a match for the captured image and consequently the user's orientation. In one implementation, the orientation calculation unit 104 may look for images associated with the user's position information that exactly match the captured image. In another implementation, the orientation calculation unit 104 may identify images associated with the user's position information that have a high degree of similarity with the captured image (e.g., correlation greater than 0.7). If the orientation calculation unit 104 can determine the user's orientation, the flow continues at block 212. Otherwise, the flow continues at block 214.

At block 212, the user's orientation is determined and communicated to the GPS receiver 108. For example, the orientation calculation unit 104 may determine and communicate the user's orientation to the GPS receiver 108. The orientation calculation unit 104 can use visual correlation to determine the user's orientation or the direction in which the user is facing thus enabling the GPS receiver 108 to calculate a more accurate position-velocity-time (PVT) solution. In response to receiving the user's orientation, the GPS receiver 108 may determine points of interest, walking directions to a destination, etc. Additionally, after the orientation calculation unit 104 transmits the user's orientation to the GPS receiver 108, the orientation calculation unit 104 may determine whether the images of the user's current location should be stored in the image database 106. The orientation calculation unit 104 may store the captured image if the number of images, in the image database 106, associated with the user's position information is less than a threshold. Alternately, the orientation calculation unit 104 may not store the captured image if the number of images, in the image database 106, associated with the user's position information exceeds the threshold. From block 212, the flow ends.

At block 214, an inability to determine the user's orientation is indicated. For example, the orientation calculation unit 104 may indicate the inability to determine the user's orientation. The orientation calculation unit 104 may be unable to determine the user's orientation if the orientation calculation unit 104 cannot find a match between the captured image and the set of images, in the image database 106, associated with the user's position information. In some implementations, the orientation calculation unit 104 may transmit, to the GPS receiver 108, a request for an alternate image from the user's current location—in the same direction, after turning by any suitable angle, etc. The GPS receiver 108, in turn, may capture multiple images, process, and transmit the multiple images taken from the user's current location after the server 108 indicates the inability to determine the user's orientation based on one captured image. In another implementation, the server 102 may instruct, via the GPS receiver 108, the user to move, so that the user's direction of motion can be established by a sequence of position estimates. In yet another implementation, in addition to transmitting a request for another captured image, the orientation calculation unit 104 may also transmit a potential match for the first image of the user's location. For example, the orientation calculation unit 104 may determine a user's possible orientation based on identifying a slight match (e.g., correlation of 0.2) match between one of the images associated with the user's position information and the captured image. The orientation calculation unit 104 may transmit the user's possible orientation and request another image in order to confirm/modify the user's possible orientation. Operations for processing multiple images will further be described with reference to FIG. 6. From block 214, the flow ends.

It should be noted that in some implementations, the orientation calculation unit 104 may be unable to identify images with the same position information (e.g., the same GPS coordinates) as the user's position information or images within a predefined distance (e.g., within a 5 mile radius) from the user's position information. In such cases, the orientation calculation unit 104 may still receive the captured image, store the image, associate the user's position information with the image, and indicate inability to determine the user's orientation.

In some implementations, the server 102 may determine that no images in the image database 106 that to which the captured image can be correlated. The server 102 may direct the user to move, determine a set of position estimates based on the user's movement, and accordingly determine the user's orientation and direction of motion. As another example, the GPS may determine the set of position estimates based on the user's movement, determine the user's orientation, and communicate the user's orientation to the server 102. As another example, a compass on the GPS receiver 108 may be used to determine the user's orientation and the GPS receiver 108 may communicate the user's orientation to the server 102. The server 102 may associate the user's orientation with the captured image to aid subsequent users estimate their orientation. The server 102 may also use the captured image and other information (e.g., position information, user's orientation, etc.) received from the GPS receiver 108 to fill gaps in the image database 106. The server 102 may also request images and other information from the GPS receiver 108 so that the server can enrich the image database 106 to service requests from users in a sparsely sampled area.

Figure 3:
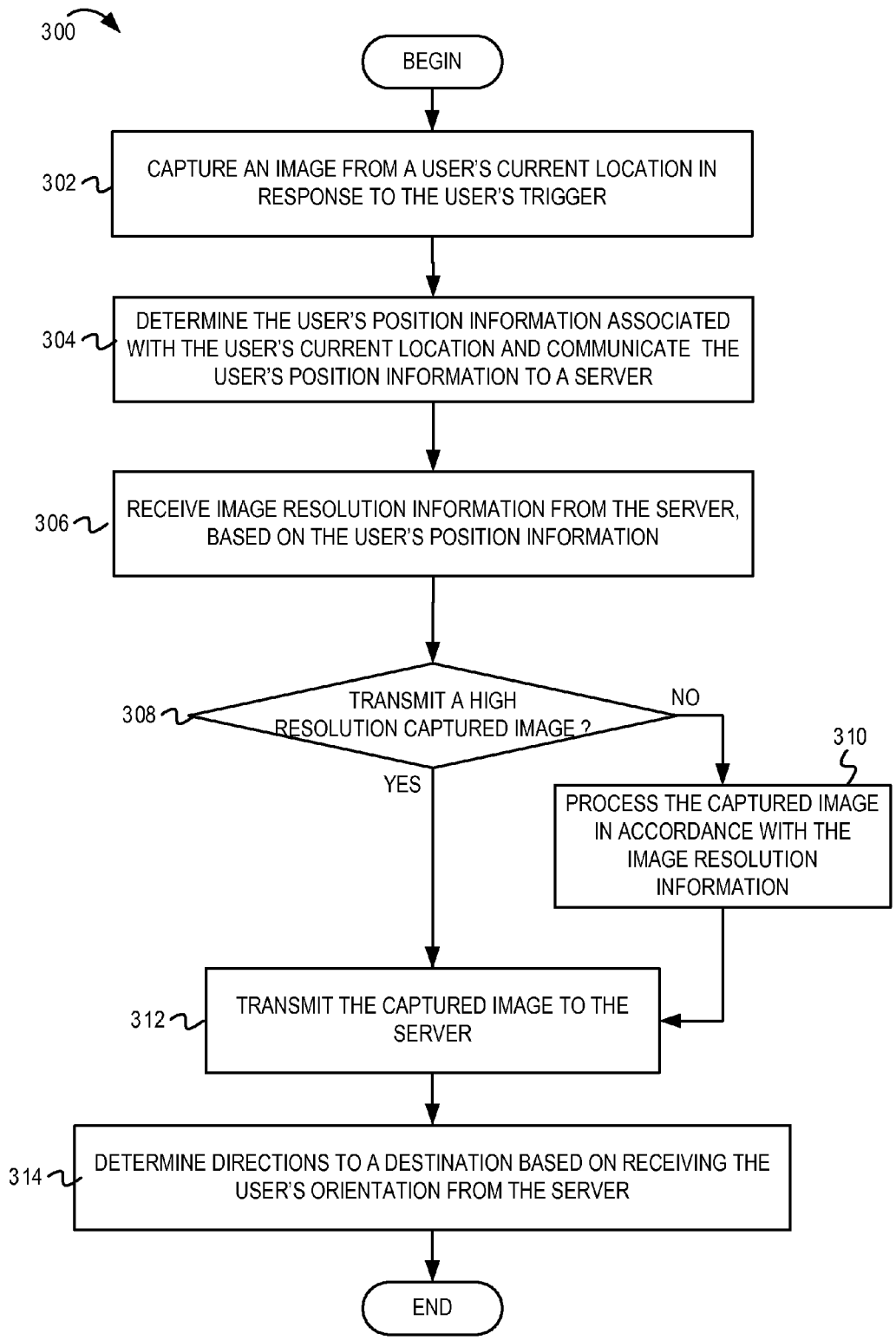
FIG. 3 is a flow diagram illustrating example operations for image-aided satellite-based orientation identification.

FIG. 3 is a flow diagram illustrating example operations for image-aided, satellite-based orientation identification. FIG. 3 describes the ability of a server and a GPS receiver to manage a size/resolution of images communicated by the GPS receiver to the server, thus minimizing communication bandwidth requirements. Flow 300 begins at block 302.

At block 302, an image from a user's current location is captured in response to the user's trigger. For example, a camera 110 of FIG. 1 may capture the image in response to the user's trigger (e.g., the user pressing a button, speaking a voice command, etc.). The flow continues at block 304.

At block 304, the user's position information associated with the user's current location is determined and communicated to a server. For example, a positioning unit 114 may determine the user's position information and communicate the user's position information to the server 102. The positioning unit 114 may determine the user's position based on receiving GPS signals from a plurality of GPS satellites, e.g., at least 4 GPS satellites. Based on receiving the GPS signals and based on knowledge of position of the GPS satellites, the positioning unit 114 can calculate a distance to the GPS satellites (that transmitted the GPS signals), and use tri-lateration or multi-lateration to determine the user's position information. In some implementations, the positioning unit 114 may communicate the user's position information to the server 102 in response to determining that the camera 110 captured the image. In another implementation, the positioning unit 114 may communicate the user's position information to the server 102 in response to receiving an indication (e.g., from a communication unit on the GPS receiver 108) that the image should be communicated to the server 102 for image-aided navigation. It is noted, however, that in some implementations, the positioning unit 114 may determine the user's position information using other techniques, e.g., Wi-Fi based techniques, cellular-based techniques, etc. The flow continues at block 306.

At block 306, image resolution information is received from the server based on the user's position information. For example, an image processing unit 112 may receive the image resolution information from the server 102. The image processing unit 112 may receive the image resolution information in response to the positioning unit 114 transmitting the user's position information to the server 102. The server 102 may determine the image resolution information based on the user's position information, a number of images, in the image database 106, associated with the user's current location, etc. The image resolution information may indicate a maximum resolution, size, dimensions, etc., of the image that may be transmitted by the GPS receiver 108. The image resolution information can be used to reduce the bandwidth requirements for transmitting the image to the server and determining the orientation information. It is noted that, in some implementations, after transmitting the user's position information, the GPS receiver 108 may wait for a predefined time interval to receive the image resolution information. If the GPS receiver 108 does not receive the image resolution information after the predefined time interval elapses, the GPS receiver 108 may transmit the captured image with the current or default resolution setting. In one example, the server 102 may not comprise capabilities for determining image resolution information. As another example, the transmission, comprising the image resolution information, from server 102 may be lost, corrupted, or delayed. Therefore, if the image resolution information is not received within the predefined time interval, the GPS receiver 108 may transmit a high resolution captured image. Alternately, in some implementations, the GPS receiver 108 may not have the capability of processing the image resolution information, and therefore the GPS receiver 108 may automatically transmit the high-resolution captured image. The flow continues at block 308.

At block 308, it is determined whether a high resolution captured image should be transmitted. For example, the image processing unit 112 may determine whether the high resolution captured image should be transmitted based on the image resolution information received from the server 102. In some implementations, the server 102 may indicate the image resolution information in a flag. For example, the server 102 may transmit a first value of the flag (e.g., flag=1) to indicate that a high resolution image should be transmitted, and transmit a second value of the flag (e.g., flag=0) to indicate that a low resolution image should be transmitted. If the image processing unit 112 determines that a high resolution captured image should be transmitted, the image processing unit 112 may not modify the captured image, and the flow continues at block 312. However, if the image processing unit 112 determines that a low resolution captured image should be transmitted, the flow continues at block 310.

At block 310, the captured image is processed in accordance with the image resolution information. For example, the image processing unit 112 may process the image based on the image resolution information received from the server 102. The image processing unit 112 may reduce the resolution, the size, and the dimensions of the image, remove extraneous details, high resolution features, image color, etc. in accordance with the image resolution information. For instance, in one example, the image processing unit 112 can process the image to reduce the resolution and size of the image. In another example, the image processing unit 112 may process and compress the captured image to yield an image that is sensitive to edges. If the server 102 indicates the image resolution information by setting a value of a flag (as described in block 308), the image processing unit 112 may read the value of the flag, determine that a low resolution image should be transmitted, and accordingly process the image (e.g., based on hardwired image processing functions, functions selected by the user or negotiated between the server 102 and the GPS receiver 108, etc.). In some implementations, in addition to indicating that a low resolution captured image should be transmitted, the server 102 can also indicate a minimum resolution of the image that should be transmitted so that the server can perform correlation operations and determine the user's orientation. For example, the server 102 can indicate that the GPS receiver 108 should transmit the captured image with a minimum file size of 1 megapixel to enable the server 102 to perform the correlation operations. As another example, the server 102 may specify smaller file sizes e.g., between 1 and 2 megapixels. The image processing unit 112 can accordingly process the captured image based on specific image resolution information provided by the server 102. After the image processing unit 112 processes the image to generate a low resolution captured image, the flow contains at block 312.

At block 312, the captured image is transmitted to the server. For example, the GPS receiver 108 may transmit the captured image to the server 102. The GPS receiver 108 may transmit a high-resolution image or a low-resolution captured image based on the image resolution information received from the server 102. From block 312, the flow continues at block 314.

At block 314, directions to a destination are determined based on receiving the user's orientation from the server. For example, the positioning unit 114 may receive the user's orientation from the server 102. The user's orientation may be determined with reference to the captured image. After the positioning unit 114 receives the user's orientation, the positioning unit 114 may determine the destination, as indicated by the user. The positioning unit 114 may determine walking directions to the destination based on knowledge of the user's orientation and the user's position information. The positioning unit 114 may also determine and present points of interest around the user's current position. From block 314, the flow ends.

In addition to communicating the captured image to the server and determining directions to the destination based on the user's orientation, the GPS receiver 108 can implement functionality to further process the image to enhance image-aided navigation as will be described with reference to FIGS. 4-6.

Figure 4:
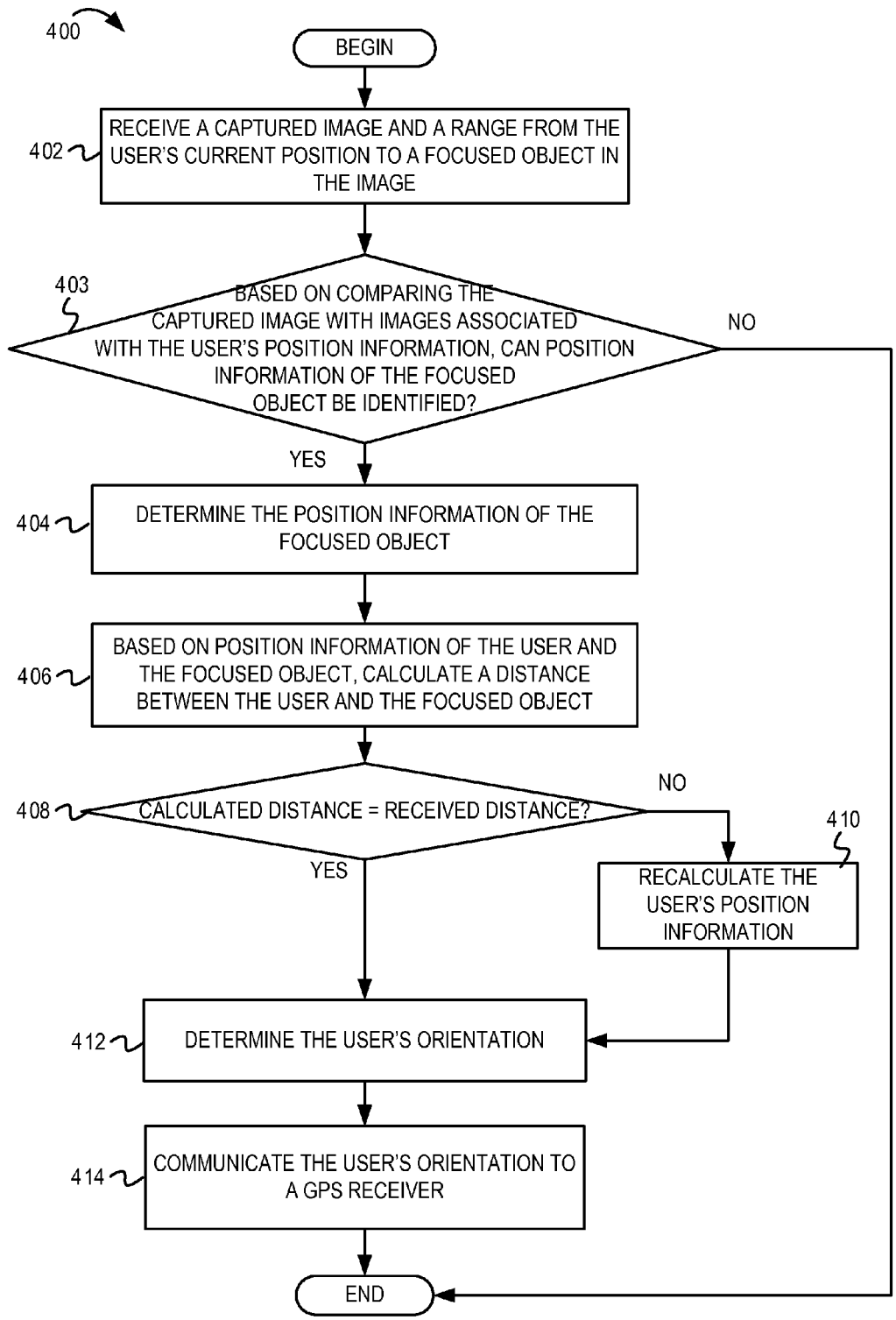
FIG. 4 is a flow diagram illustrating example operations for refining a user's position information based on a calculated range to perform image-aided, satellite-based navigation.

FIG. 4 is a flow diagram illustrating example operations for refining a user's position information based on a calculated range to perform image-aided, satellite-based navigation. FIG. 4 describes operations for using an image and range information from a GPS receiver to validate an estimate of the position of the GPS receiver that is communicated from the GPS receiver to the server. Flow 400 begins at block 402.

At block 402, an image captured from a user's current location and a distance between the user's current position and a focused object in the image is received. For example, the orientation calculation unit 104 of the server 102 (shown in FIG. 1) may receive, from the GPS receiver 108, the captured image (captured by the camera 110), and the distance between the user's current position and the focused object in the image. The orientation calculation unit 104 may also receive the user's position information from the GPS receiver 108. In some implementations, the GPS receiver 108 may comprise a camera 110 that captures the image (in response to detecting a trigger from the user). The GPS receiver 108 may also comprise a range calculation unit as part of a lens-focusing unit in the camera 110. The range calculation unit may transmit a signal, measure travel time of the pulse, determine a distance between the user's current position and an object in the path of the pulse, accordingly adjust the focal length, and bring the object into focus. The distance determined as part of the lens-focusing functionality is also the distance between the user's current position and the focused object. In addition to enhancing the camera's (110) focusing ability, transmitting the distance between the user's current position and the focused object in the image can enable the orientation calculation unit 104 to validate the user's position information. In one implementation, the range calculation unit may implement sound navigation and ranging (SONAR) to determine the distance between the user's current position and the focused object in the image. The flow continues at block 403.

At block 403, it is determined whether position information of the focused object can be identified based on comparing the captured image with images associated with the user's position information. For example, the orientation calculation unit 104 may compare the captured image with images in an image database 106 and determine whether the position information of the focused object can be determined. The orientation calculation unit 104 may first determine whether the focused object in the captured image can be identified from the images associated with the user's position information. If it can be identified, the orientation calculation unit 104 can try to determine GPS coordinates (or other suitable position information) of the focused object. The orientation calculation unit 104 may be unable to determine the position information of the focused object if the orientation calculation unit 104 cannot find a match between the captured image and at least one of the images associated with the user's position information. If the orientation calculation unit 104 determines that the position information of the focused object can be identified, the flow continues at block 404. Otherwise, the flow ends.

At block 404, the position information of the focused object is determined. For example, the orientation calculation unit 104 may determine the position information of the focused object. In response to comparing the captured image with the images associated with the user's position information, the orientation calculation unit 104 may identify the focused object. For example, the orientation calculation unit 104 may determine a name of the focused object. As another example, the orientation calculation unit 104 may use optical character recognition (OCR) or other suitable text recognition techniques to read (if possible) a name of the focused object (e.g., a building, a restaurant name, etc.). Once the orientation calculation unit 104 identifies the focused object, the orientation calculation unit 104 may consult a database on the server to determine the position information (e.g., GPS coordinates, altitudes and longitudes, etc.) of the focused object. The flow continues at block 406.

At block 406, a distance between the user and the focused object is determined based on the user's position information and the position information of the focused object. For example, the orientation calculation unit 104 may calculate the distance between the user and the focused object. The flow continues at block 408.

At block 408, it is determined whether the calculated distance between the user and the focused object (determined at block 406) is equal to the received distance between the user and the focused object (received at block 402 from the GPS receiver 108). For example, the orientation calculation unit 104 may determine whether the calculated distance is equal to the received distance. In doing so, the orientation calculation unit 104 can determine whether the user's position information is accurate or whether the user's position information should be further refined. For example, the orientation calculation unit 104 may determine, based on the distance received from the GPS receiver 108, that the focused object is 100 feet away from the user. However, based on the distance calculated using the user's position information and the position of the focused object, the orientation calculation unit 104 may determine that the focused object is 300 feet away from the user. The orientation calculation unit 104 may accordingly determine that the user's position information should be refined. It is noted that in some embodiments, the calculated distance between the user and the focused object and the received distance between the user and the focused object may be deemed to be equal if the two distances are approximately equal within a predefined error e.g., if an absolute difference between the two distances is 10 feet. If the orientation calculation unit 104 determines that the calculated distance is equal to the received distance, the flow continues at block 412. Otherwise, the flow continues at block 410.

At block 410, the user's position information is recalculated. For example, the server 102 may request a new estimate of the user's position information from the GPS receiver 108. In one implementation, the server 102 may transmit the distance between the user and the focused object (determined at block 406) to aid the GPS receiver's determination of the new estimate of the user's position information. In another implementation, the server 102 may request raw GPS measurement information from the GPS receiver 108 and use the raw GPS measurement information and the distance between the user and the focused object to calculate the new estimate of the user's position information. The flow continues at block 412.

At block 412, the user's orientation is determined based on the user's position information. For example, the orientation calculation unit 104 may determine the user's orientation. As described with reference to FIG. 2, the orientation calculation unit 104 can determine the user's orientation based on comparing the captured image with the images, associated with the user's position information, in the image database 106. The orientation calculation unit 104 can correlate the captured image with the images associated with user's position information, determine one or more images that are highly correlated with the captured image, and accordingly determine the user's orientation. The flow continues at block 414.

At block 414, the user's orientation is communicated to the GPS receiver. For example, the orientation calculation unit 104 may communicate the user's orientation to the GPS receiver 108. If the orientation calculation unit 104 determines the user's new position information, the orientation calculation unit 104 may also communicate the new position information to the GPS receiver 108. In some implementations, if the orientation calculation unit 104 is unable to determine the user's orientation, the orientation calculation unit 104 may indicate inability to determine the user's orientation and may only communicate the new position information (is applicable) to the GPS receiver 108. It should be noted that if the orientation calculation unit 104 is unable to determine the user's orientation, the orientation calculation unit 104 may direct the GPS receiver 108 to use an on-board compass, a motion sensor, etc. to determine the user's orientation. From block 414, the flow ends.

Figure 5:
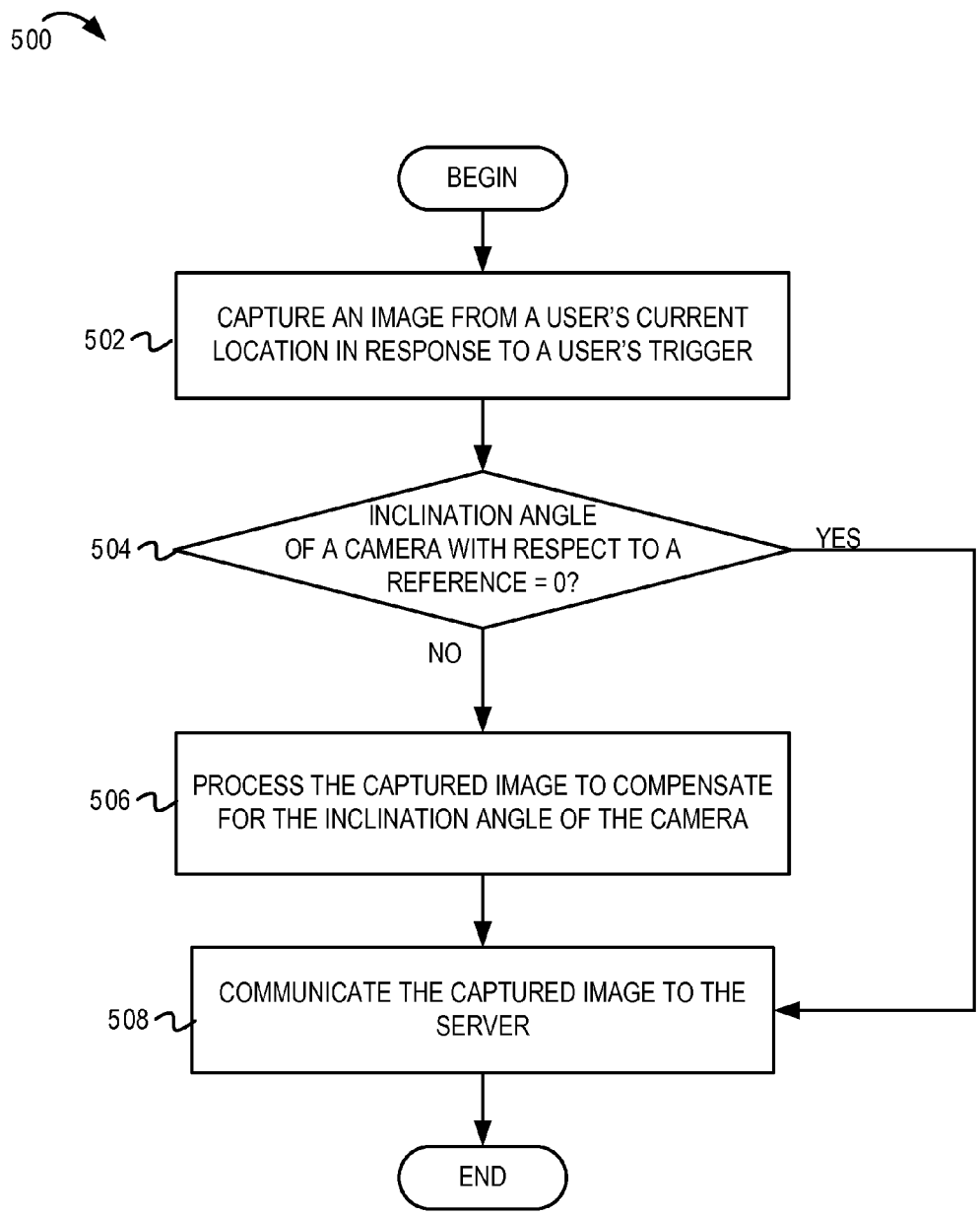
FIG. 5 is a flow diagram illustrating example operations for correcting image inclination to enhance image-aided satellite-based navigation.

FIG. 5 is a flow diagram illustrating example operations for correcting image inclination to enhance image-aided satellite-based navigation. Flow 500 begins at block 502.

At block 502, an image from a user's current location is captured in response to the user's trigger. For example, the camera 110 of the GPS receiver 108 (shown in FIG. 1) may capture the image in response to the user pressing a button, speaking a voice command, etc. The flow continues at block 504.

At block 504, it is determined whether an inclination angle of the camera with respect to a reference is zero. For example, a tilt compensation unit on the GPS receiver 108 may determine the inclination angle of the camera 110 and determine whether the inclination angle is zero. The tilt compensation unit may determine the inclination angle with respect to gravity or based on information from one or more sensors embedded in the GPS receiver 108. In one implementation, the tilt compensation unit may comprise an inclinometer that determines the inclination of the camera 110. The inclinometer may also determine the direction of inclination, e.g., whether the camera 110 is being pitched forward or backward, etc. If it is determined that the inclination angle with respect to the reference is not zero, the flow continues at block 506. Otherwise, the flow continues at block 508.

At block 506, the captured image is processed to compensate for the inclination angle of the camera. For example, an image processing unit 112 may process the captured image to compensate for the inclination angle of the camera 110. In one implementation, the image processing unit 112 may receive an indication of the inclination angle and the direction of inclination from the inclinometer and accordingly process the image to compensate for the inclination. The inclinometer determines the inclination angle and the direction of inclination relative to the gravity field. The inclinometer may estimate a pitch (a tilt in an upwards or downwards direction) or roll (a rotation of the camera along a horizontal axis). The image processing unit 112 can rotate the captured image in a direction opposite to the direction of inclination to compensate for the inclination angle of the camera 110. For example, the image processing unit 112 may determine that the captured image was taken with the camera 110 pitched upward at a 10 degree angle. The image processing unit 112 may rotate the image by 10 degrees downward to compensate for the pitch. By processing the image to compensate for the inclination angle of the camera 110, the amount of image processing that needs to be performed by the server 102 can be reduced. For example, by correcting the tilt in the image, the server 102 may not be required to correlate the captured image with other images associated with the user's position information over additional degrees of freedom (e.g., pitch, roll, etc.). The flow continues at block 508.

At block 508, the captured image is communicated to the server. For example, the GPS receiver 108 may communicate the captured image to the server 102. The server 102, in turn, may determine the user's orientation based on the captured image, as described above with reference to FIG. 2. In another implementation, the server 102 may use the pitch and roll measurements from the camera to correct the captured image. From block 508, the flow ends.

Figure 6:
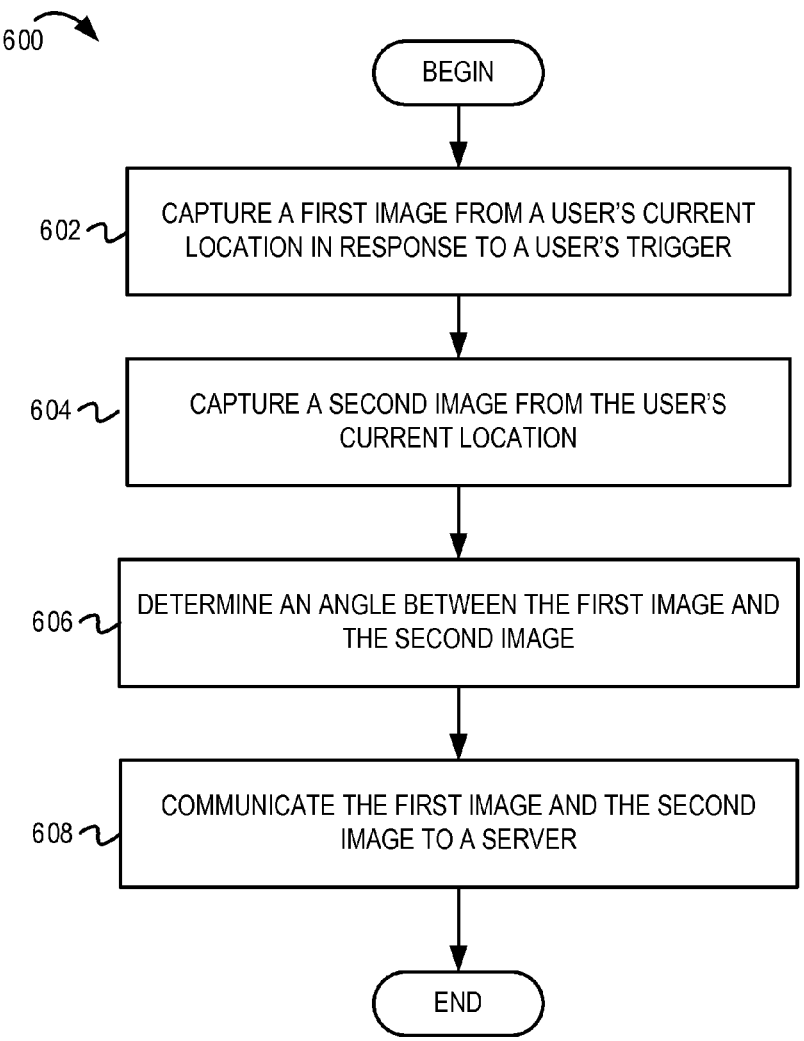
FIG. 6 is a flow diagram illustrating example operations for capturing and transmitting multiple images for image-aided satellite-based navigation.

FIG. 6 is a flow diagram illustrating example operations for capturing and transmitting multiple images for image-aided, satellite-based navigation. Flow 600 begins at block 602.

At block 602, a first image from a user's current location is captured in response to the user's trigger. For example, the camera 110 of the GPS receiver 108 may capture the first image in response to the user pressing a button, speaking a voice command, etc. The flow continues at block 604.

At block 604, a second image from the user's current location is captured. In one implementation, the user may rotate the camera 110 by a suitable angle (e.g., 90 degrees) and capture the second image. In another implementation, the user may face in another direction and capture the second image. For example, the user may turn 180 degrees and capture the second image. In another implementation, the GPS receiver 108 may comprise a second camera. The second camera may capture the second image in response the user pressing a button, speaking a voice command, etc. For example, the GPS receiver 108 may comprise a first camera that captures the first image in the direction that the user is facing and a second camera (e.g., on the opposite side of the GPS receiver 108) that captures the second image in the opposite direction, so that the angle between the first and the second images is 180 degrees. It should be noted that, in some implementations, the second camera may be integrated into the side of the GPS receiver 108 so that the angle between the first and the second images is 90 degrees or 270 degrees. The flow continues at block 606.

At block 606, an angle between the first image and the second image is determined. For example, an image processing unit 112 may determine the angle between the first image and the second image. In one implementation, the image processing unit 112 may determine the angle between the first image and the second image based on knowledge of a predetermined angle between the images. For example, with the knowledge that the first image and the second image were captured by a forward facing camera and a back facing camera respectively, the image processing unit may determine that the angle between the first image and the second image is 180 degrees. In another implementation, the GPS receiver 108 may include a gyroscope. The image processing unit 112 may rely on the gyroscope of the GPS receiver 108 to determine the angle between the first image and the second image, and relate the first image and the second image to each other in bearings. For example, the gyroscope may determine that the second image is rotated (along a vertical axis) by 160 degrees with reference to the first image. The flow continues at block 608.

At block 610, the first image and the second image are communicated to the server. For example, the GPS receiver 108 may communicate the first image and the second image to the server 102. The GPS receiver 108 may also communicate any information that describes the angle between the first and the second images. In some implementations, the GPS receiver 108 may also indicate similarities between the first image and the second image. From block 610, the flow ends.

Receiving two images may enable the server 102 to strengthen the weak correlations that may result from processing a single image. Alternatively, receiving two images may enable the server 102 to search through a wider array of images, in the image database 106, associated with the user's position estimate. The server 102 may correlate the second image with images associated with the user's position information, may combine the first and the second images, etc. In some implementations, the GPS receiver 108 may automatically transmit two or more images to the server every time the user initiates a navigation feature. For example, the GPS receiver 108 may comprise multiple cameras each of which may capture images that are transmitted to the server 102. In other implementations, the server 102 may request the second image from the GPS receiver 108, to improve correlation operations and the possibility of determining the user's orientation, if the server 102 cannot determine the user's orientation with only the first image.

It should be understood that the depicted flow diagrams (FIGS. 2-6) are examples meant to aid in understanding embodiments and should not be used to limit embodiments or limit scope of the claims. Embodiments may perform additional operations, fewer operations, operations in a different order, operations in parallel, and some operations differently. For instance, although FIG. 6 describes the GPS receiver 108 capturing and transmitting two captured images to the server 102, in some implementation the GPS receiver 108 can capture and transmit any suitable number of images to the server 102. Also, the GPS receiver 108 may comprise one, two, or any suitable number of cameras. Each of the multiple cameras may capture one or more images from the user's current location in response to the user's trigger. In some implementations, the GPS receiver 108 may implement a video capturing functionality, which may be used for image-aided satellite-based navigation. The user may capture a video from his/her current location, turning in various directions so as to capture a large number of reference points. The GPS receiver 108 may transmit the video clip to the server 102. The server 102, in turn, may compare still images from the video clip to images, associated with the user's position information, to determine the user's orientation.

It should also be noted that although the FIGS. 1-6 describe the GPS receiver 108 determining directions to the destination, in some implementations, in addition to determining and communicating the user's orientation, the server 102 may also determine and communicate the directions to the destination. The server 102 may also store one or more of the captured images in the image database 106 and associate the user's position information with the captured image(s). The captured image(s) and/or the user's orientation may be used to serve subsequent users requesting orientation from nearby locations. Alternatively, the server 102 may discard the captured image if not enough features can be extracted or if the server 102 does not need additional images of the user's current location. The server 102 may also discard the captured image if privacy concerns should so dictate. The server 102 may also further process the captured image (e.g., identify other objects, points of interest, etc.), identify new points of interest (e.g., restaurants), update a database comprising the points of interest, etc. For example, based on processing the captured image, the server 102 may determine that a restaurant has been converted into a bookstore. The server 102 may accordingly update the database by removing an indication of the restaurant and adding an indication of the bookstore.

In some implementations, the server 102 may use information extracted from various images to implement functionality for geotagging. In addition to communicating the user's orientation to the GPS receiver 108, the server 102 may also transmit metadata that can be used for indicating various objects on the captured image. The server 102 can use geotagging to present the user with real-time points of interest. The GPS receiver 108 may present the captured image on a display unit and overlay location-specific information on the image. The GPS receiver 108 may indicate name of places and other information associated with the places (e.g., average price of lunch at a restaurant captured in the image). As another example, if the captured image comprises a shopping mall, the GPS receiver 108 may receive metadata from the server 102 describing other objects in the captured image. Based on the metadata, the GPS receiver 108 can overlay text on the image. The overlaid text may indicate, for example, a name of the mall, and names of stores on each floor of the shopping mall (e.g., food court on the first floor, women's clothing shops on the second floor, men's clothing shops on the third floor, etc.).

In other implementations, when the user activates an image-based navigation feature of the GPS receiver 108, the GPS receiver 108 can transmit the user's position information to the server 102. In these embodiments, when the GPS receiver 108 transmits the position information, the GPS receiver 108 can also transmit resolution range information associated with the camera 110. The resolution range information can indicate a range of resolutions at which the camera 110 can capture images, e.g., from 1 megapixels to 5 megapixels. The server 102 can receive the resolution range information associated with the camera 110, perform the operations to determine the image resolution information, and determine a minimum resolution of the captured image in order to perform the correlation operations to determine the user's orientation. For example, the server 102 may determine that the server 102 needs an image with the highest possible resolution, and therefore may indicate that the GPS receiver 108 should transmit an image with a resolution of 5 megapixels. As another example, the server 102 may determine that the server needs a low resolution image and direct the GPS receiver 108 to transmit an image with fewer than 2 megapixels. In some implementations, the image processing unit 112 can receive the image resolution information and automatically adjust resolution settings in the camera 110 to capture an image with the specified resolution. For example, if the default resolution settings in the camera 110 is 5 megapixels, and the image resolution information, as specified by the server 102, is 2 megapixels, the image processing unit 112 can automatically adjust the resolution settings in the camera 110 so that the camera 110 capture an image with a resolution of 2 megapixels. After the image processing unit 112 programs the resolution settings in the camera 110, the image processing unit 112 can display a message to the user to generate a trigger (e.g., press a button, speak a voice command, etc.) to capture the image.

Also, in some implementations, instead of waiting for the server 102 to transmit the image resolution information based on the user's position information, the GPS receiver 108 may transmit the user's position information along with a low resolution captured image. If the server 102 is unable to determine the user's orientation based on the low resolution image, the server 102 may request the GPS receiver 108 to transmit a higher resolution captured image or to capture multiple images. The server 102 may also request the high resolution image if the server 102 determines that the captured image should be stored in the image database 106.

Furthermore, in some implementations, the GPS receiver 108 may not compensate for the inclination angle of the camera (as described in block 506). Instead, the GPS receiver 108 may determine and communicate, to the server 102, the captured image, the inclination angle of the camera 110, and the direction of inclination. The server 102 may accordingly process the image and compensate for the inclination in the image before determining the user's orientation.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). In some embodiments, the machine-readable medium may be non-transitory machine-readable medium, which may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions (i.e., machine readable storage medium). In addition, other embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
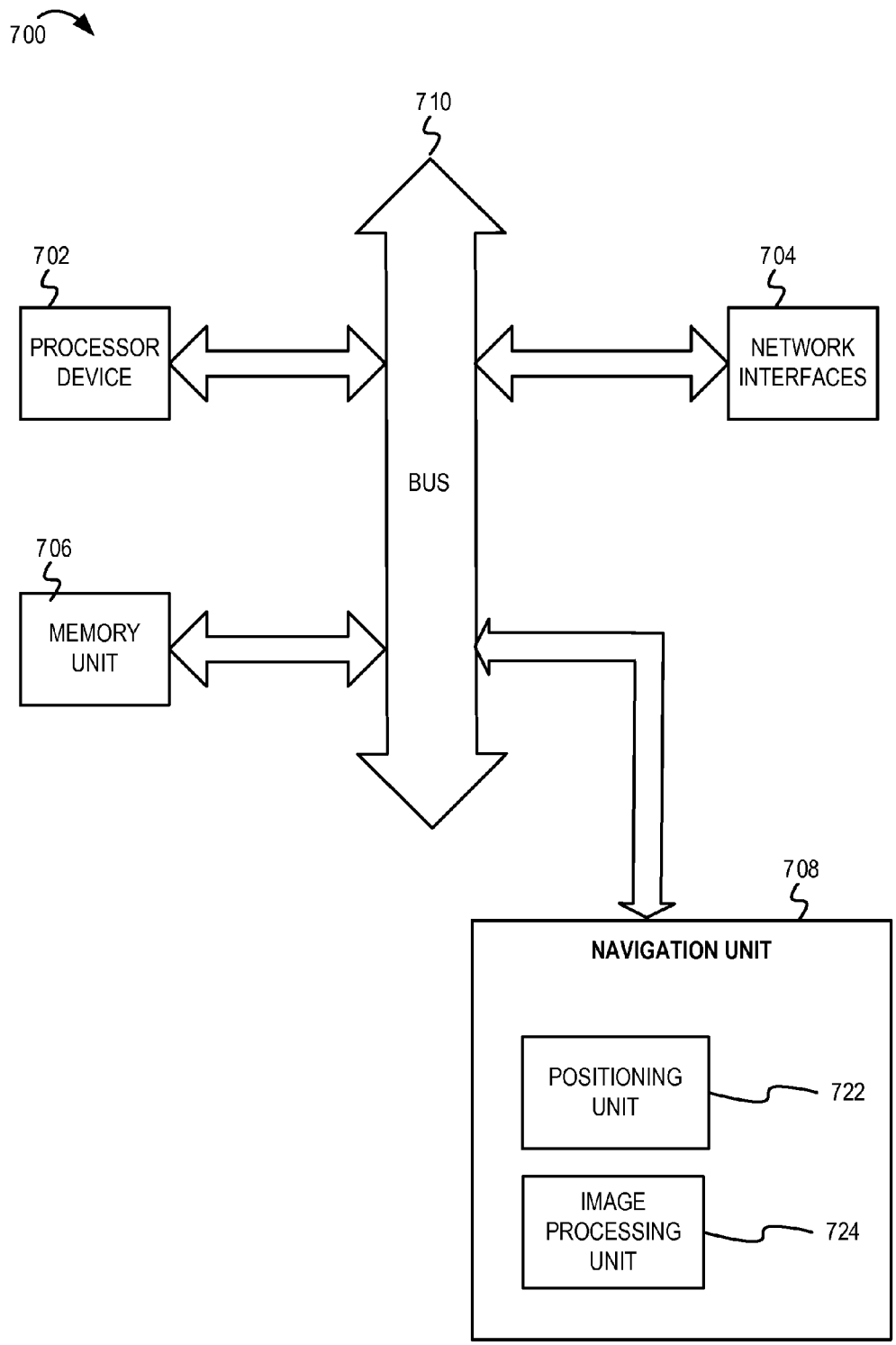
FIG. 7 is a block diagram of one embodiment of an electronic device including a mechanism for image-aided satellite-based navigation.

FIG. 7 is a block diagram of one embodiment of an electronic device 700 including a mechanism for image-aided, satellite-based navigation. In some implementations, the electronic device 700 may be one of a mobile phone, a personal digital assistant (PDA), or other electronic system comprising a navigation device. The electronic device 700 includes a processor device 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, etc.), and network interfaces 704 that include at least one wireless network interface (e.g., a WLAN interface, a Bluetooth® interface, a WiMAX interface, a ZigBee® interface, a Wireless USB interface, etc.).

The electronic device 700 also includes a navigation unit 708. The navigation unit 708 comprises a positioning unit 722 and an image processing unit 724. The navigation unit 708 or the electronic device 700 may comprise a camera that captures an image from a user's current location (e.g., in a direction in which the user is facing). The navigation unit 708 can be configured to perform the operations described above with reference to FIGS. 1-6 to implement image-aided, satellite-based navigation. It should be noted that any one of the above-described functionalities might be partially (or entirely) implemented in hardware and/or on the processing unit 702. For example, the functionality may be implemented with an application specific integrated circuit, in logic implemented in the processing unit 702, in a co-processor on a peripheral device or card, etc. Further, realizations may include fewer or additional components not illustrated in FIG. 7 (e.g., additional network interfaces, peripheral devices, etc.). The processor unit 702 and the network interfaces 704 are coupled to the bus 710. Although illustrated as being coupled to the bus 710, the memory 706 may be coupled to the processor unit 702.

While the embodiments are described with reference to various implementations and exploitations, it will be understood that these embodiments are illustrative and that the scope of the inventive subject matter is not limited to them. In general, techniques for image-aided, satellite-based navigation techniques as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving, at a server, position information of a mobile device indicative of a current location of the mobile device;
   determining whether one or more of a plurality of reference images, associated with the server, are associated with the position information of the mobile device;
   determining a resolution of an image that should be received from the mobile device based, at least in part, on a number of the plurality of reference images that are associated with the position information of the mobile device;
   transmitting, to the mobile device, an indication of the resolution of an image that should be provided from the mobile device;
   receiving, at the server, a first image captured by the mobile device indicative of an orientation of the mobile device;
   comparing the first image to the one or more of the plurality of reference images, if the one or more of the plurality of reference images are associated with the position information of the mobile device; and
   determining an orientation of the mobile device based, at least in part, on results of said comparing the first image to the one or more of the plurality of reference images associated with the position information of the mobile device.

2. The method of claim 1, wherein:
   said comparing the first image to the one or more of the plurality of reference images that are associated with the position information of the mobile device further comprises identifying a reference image that matches the first image; and
   said determining the orientation of the mobile device further comprises determining the orientation based on the reference image that matches the first image.

3. The method of claim 2, wherein said determining the orientation based on the reference image that matches the first image further comprises determining location and orientation information associated with the reference image that matches the first image and associating the orientation information associated with the reference image that matches the first image with the mobile device.

4. The method of claim 2, wherein said identifying the reference image that matches the first image further comprises determining an image of the plurality of reference images associated with the position information of the mobile device that matches the first image at least by a predefined value.

5. The method of claim 1, wherein said comparing the first image to the one or more of the plurality of reference images further comprises comparing objects in the first image with objects in the one or more of the plurality of reference images associated with the position information of the mobile device to identify a reference image that comprises objects that match the objects in the first image.

6. The method of claim 1, wherein the position information of the mobile device comprises location coordinates of the mobile device.

7. The method of claim 1, wherein the plurality of reference images, associated with the server, comprise images, stored in the server, that are associated with various geographic locations, and images downloaded to the server from an external server.

8. The method of claim 1, further comprising:
   receiving, at the server, a first distance between the mobile device and a focused object in the first image from the mobile device;
   estimating position information of the focused object in the first image, indicative of a location of the focused object, based on comparing the first image to the one or more of the plurality of reference images associated with the position information of the mobile device and identifying the focused object;
   determining a second distance between the mobile device and the focused object in the first image, based on said determining the position information of the focused object in the first image;
   determining whether the first distance and the second distance are equal; and
   re-estimating the position information of the mobile device to yield a new position information of the mobile device if it is determined that the first distance and the second distance are not equal.

9. The method of claim 1, further comprising:
   determining an orientation of the mobile device cannot be determined based on said comparing the first image to the one or more of the plurality of reference images associated with the position information of the mobile device; and
   transmitting, to the mobile device, a request for a second image of the current location of the mobile device to determine the orientation of the mobile device.

10. The method of claim 1, further comprising associating with the server at least one of the first image, the position information of the mobile device, and the orientation of the mobile device.

11. The method of claim 1, wherein said receiving the position information of the mobile device indicative of the current location of the mobile device comprises receiving the position information from at least one of a plurality of satellites, determining the position information using one or more Wi-Fi based positioning techniques, and determining the position information using one or more cellular-based positioning techniques.

12. A method comprising:
   capturing a first image at a mobile device, wherein the first image is indicative of a current location and orientation of the mobile device;
   estimating position information associated with the mobile device, wherein the position information is indicative of the current location of the mobile device;
   transmitting the position information associated with the mobile device to a server;
   receiving, from the server, image resolution information for the first image based, in part, on the position information of the mobile device, wherein the image resolution information is indicative of a first resolution;
   processing the first image in response to said receiving the image resolution information to yield a processed first image having the first resolution;
   transmitting the processed first image at the first resolution to the server; and receiving, from the server, an orientation of the mobile device determined based on the first image and the position information.

13. The method of claim 12, wherein the mobile device comprises satellite-based navigation capabilities and wherein said estimating the position information associated with the mobile device further comprises estimating the position information based on a plurality of satellites.

14. The method of claim 13, further comprising determining routing information based, at least in part, on the orientation of the mobile device, wherein said determining the routing information comprises:
   determining position information of a destination location; and
   determining the routing information based, at least in part, on the orientation of the mobile device, the position information associated with the mobile device comprising satellite-based navigation capabilities, and the position information of the destination location.

15. The method of claim 12, further comprising:
   determining an angle of inclination and a direction of inclination based on said capturing the first image at the mobile device;
   determining that the angle of inclination of the first image is not zero; and
   processing the first image to compensate for inclination by rotating the first image in a direction opposite to the direction of inclination by the angle of inclination.

16. The method of claim 12, further comprising:
   capturing a second image at the mobile device, wherein the second image is indicative of the current location and orientation of the mobile device;
   determining an angle of separation between the first image and the second image; and
   transmitting, to the server, the first image, the second image, and the angle of separation between the first image and the second image.

17. A server comprising:
   an image database unit configured to store a plurality of reference images of a plurality of geographic locations; and
   an orientation calculation unit configured to:
      receive position information, of a mobile device, indicative of a current location of the mobile device;
      determine whether one or more of the plurality of reference images, stored in the image database unit, are associated with the position information of the mobile device;
      determine a resolution of an image that should be received from the mobile device based, at least in part, on a number of the plurality of reference images that are associated with the position information of the mobile device;
      transmit, to the mobile device, an indication of the resolution of an image that should be provided from the mobile device;
      receiving, at the server, a first image captured by a mobile device indicative of an orientation of the mobile device;
      compare the first image to the one or more of the plurality of reference images, if the one or more of the plurality of reference images are associated with the position information of the mobile device; and
      determine an orientation of the mobile device based, at least in part, on results of the orientation calculation unit comparing the first image to the one or more of the plurality of reference images associated with the position information of the mobile device.

18. The server of claim 17, wherein:
   the orientation calculation unit configured to compare the first image to the one or more of the plurality of reference images that are associated with the position information of the mobile device further comprises the orientation calculation unit configured to identify a reference image that matches the first image; and
   the orientation calculation unit configured to determine the orientation of the mobile device further comprises the orientation calculation unit configured to determine the orientation based on the reference image that matches the first image.

19. The server of claim 18, wherein the orientation calculation unit configured to determine the orientation based on the reference image that matches the first image further comprises the orientation calculation unit configured to determine location and orientation information associated with the reference image that matches the first image and to associate the orientation information associated with the reference image that matches the first image with the mobile device.

20. The server of claim 17, wherein the orientation calculation unit configured to compare the first image to the one or more of the plurality of reference images further comprises the orientation calculation unit configured to compare objects in the first image with objects in the one or more of the plurality of reference images associated with the position information of the mobile device to identify a reference image that comprises objects that match the objects in the first image.

21. The server of claim 17, wherein the orientation calculation unit is further configured to:
   receive, at the server, a first distance between the mobile device and a focused object in the first image from the mobile device;
   estimate position information of the focused object in the first image, indicative of a location of the focused object, based on the orientation calculation unit comparing the first image to the one or more of the plurality of reference images associated with the position information of the mobile device and identifying the focused object;
   determine a second distance between the mobile device and the focused object in the first image, based on the orientation calculation unit determining the position information of the focused object in the first image;
   determine whether the first distance and the second distance are equal; and
   re-estimate the position information of the mobile device to yield a new position information of the mobile device if it is determined that the first distance and the second distance are not equal.

22. A mobile device comprising:
   an image processing unit configured to:
      capture a first image, wherein the first image is indicative of a current location and orientation of the mobile device;
   a positioning unit configured to:
      estimate position information associated with the mobile device based on a plurality of satellites, wherein the position information is indicative of the current location of the mobile device;
      transmit the position information associated with the mobile device to a server;
      receive, from the server, image resolution information for the first image based, in part, on the position information of the mobile device, wherein the image resolution information is indicative of a first resolution;

process the first image in response to receiving the image resolution information to yield a processed first image having the first resolution;

transmit the processed first image at the first resolution to the server; and receive, from the server, an orientation of the mobile device determined based on the first image and the position information.

23. The mobile device of claim 22, wherein the image processing unit is configured to:

determine an angle of inclination and a direction of inclination based on said the image processing unit capturing the first image at the mobile device;

determine that the angle of inclination of the first image is not zero; and process the first image to compensate for inclination by rotating the first image in a direction opposite to the direction of inclination by the angle of inclination.

24. The mobile device of claim 22, wherein the image processing unit is configured to:

capture a second image at the mobile device, wherein the second image is indicative of the current location and orientation of the mobile device;

determine an angle of separation between the first image and the second image; and transmit, to the server, the first image, the second image, and the angle between the first image and the second image.

25. A non-transitory machine-readable storage media having machine executable instructions stored therein, the machine executable instructions comprising instructions to:

receive, at a server, position information of a mobile device indicative of a current location of the mobile device;

determine whether one or more of a plurality of reference images, associated with the server, are associated with the position information of the mobile device;

determine a resolution of a first image that should be received from the mobile device based, at least in part, on a number of the plurality of reference images that are associated with the position information of the mobile device;

transmit, to the mobile device, an indication of the resolution of a first image that should be provided from the mobile device;

receive the first image captured by the mobile device indicative of an orientation of the mobile device;

compare the first image to the one or more of the plurality of reference images, if the one or more of the plurality of reference images are associated with the position information of the mobile device; and determine an orientation of the mobile device based, at least in part, on results of said comparing the first image to the one or more of the plurality of reference images associated with the position information of the mobile device.

26. A non-transitory machine-readable storage media having machine executable instructions stored therein, the machine executable instructions comprising instructions to:

capture a first image at a mobile device, wherein the first image is indicative of a current location and orientation of the mobile device;

estimate position information associated with the mobile device, wherein the position information is indicative of the current location of the mobile device;

transmit the position information associated with the mobile device to a server;

receive, from the server, image resolution information for the first image based, in part, on the position information of the mobile device, wherein the image resolution information is indicative of a first resolution;

process the first image in response to said receiving the image resolution information to yield a processed first image having the first resolution;

transmit the processed first image at the first resolution to the server; and receive, from the server, an orientation of the mobile device determined based on the first image and the position information.

27. A method comprising: receiving, at a server, position information of a mobile device indicative of a current location of the mobile device; determining whether one or more of a plurality of reference images, associated with the server, are associated with the position information of the mobile device; if determined that the one or more of the plurality of reference images, associated with the server, are associated with the position information of the mobile device, comparing a first image captured by the mobile device to the one or more of the plurality of reference images, if the one or more of the plurality of reference images are associated with the position information of the mobile device, wherein the first image is indicative of an orientation of the mobile device; determining an orientation of the mobile device based, at least in part, on results of said comparing the first image to the one or more of the plurality of reference images associated with the position information of the mobile device if determined that the one or more of the plurality of reference images, associated with the server, are not associated with the position information of the mobile device; providing a notification to the mobile device indicating that the one or more of the plurality of reference images, associated with the server, are not associated with the position information of the mobile device, wherein the notification comprises instructions to move the mobile device; determining one or more position estimates based on movement of the mobile device; and estimating at least one of a direction of motion of the mobile device and the orientation of the mobile device based on said determining the one or more position estimates.

28. A method comprising: receiving, at a server, position information of a mobile device indicative of a current location of the mobile device; determining whether one or more of a plurality of reference images, associated with the server, are associated with the position information of the mobile device; if determined that the one or more of the plurality of reference images, associated with the server, are associated with the position information of the mobile device, comparing a first image captured by the mobile device to the one or more of the plurality of reference images, if the one or more of the plurality of reference images are associated with the position information of the mobile device, wherein the first image is indicative of an orientation of the mobile device; determining an orientation of the mobile device based, at least in part, on results of said comparing the first image to the one or more of the plurality of reference images associated with the position information of the mobile device if determined that the one or more of the plurality of reference images, associated with the server, are not associated with the position information of the mobile device; providing a notification to the mobile device indicating that the one or more of the plurality of reference images, associated with the server, are not associated with the position information of the mobile device; receive compass measurements from a compass on the mobile device; and determining the orientation of the mobile device based on the compass measurements received from the compass on the mobile device.

* * * * *